(12) United States Patent
Kannan et al.

(10) Patent No.: US 11,928,336 B2
(45) Date of Patent: Mar. 12, 2024

(54) SYSTEMS AND METHODS FOR HETEROGENEOUS STORAGE SYSTEMS

(71) Applicants: Samsung Electronics Co., Ltd., Suwon-si (KR); RUTGERS, THE STATE UNIVERSITY OF NEW JERSEY, New Brunswick, NJ (US)

(72) Inventors: Sudarsun Kannan, Rahway, NJ (US); Yujie Ren, Piscataway, NJ (US); Rekha Pitchumani, Herndon, VA (US); David Domingo, Bloomfield, NJ (US)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

(21) Appl. No.: 17/900,830

(22) Filed: Aug. 31, 2022

(65) Prior Publication Data

US 2023/0280905 A1 Sep. 7, 2023

Related U.S. Application Data

(60) Provisional application No. 63/355,377, filed on Jun. 24, 2022, provisional application No. 63/350,818, filed on Jun. 9, 2022, provisional application No. 63/316,403, filed on Mar. 3, 2022.

(51) Int. Cl.
*G06F 3/06* (2006.01)
*G06F 16/13* (2019.01)

(52) U.S. Cl.
CPC .......... *G06F 3/0613* (2013.01); *G06F 3/0643* (2013.01); *G06F 3/0667* (2013.01); *G06F 3/0685* (2013.01); *G06F 16/134* (2019.01)

(58) Field of Classification Search
CPC .... G06F 3/0613; G06F 3/0643; G06F 3/0667; G06F 3/0685; G06F 16/134
See application file for complete search history.

(56) References Cited

U.S. PATENT DOCUMENTS

| | | | |
|---|---|---|---|
| 7,653,699 B1 * | 1/2010 | Colgrove | G06F 16/10 709/215 |
| 8,984,241 B2 | 3/2015 | Aizman | |
| 9,251,114 B1 * | 2/2016 | Ancin | H04L 63/08 |
| 9,294,567 B2 | 3/2016 | Hussain et al. | |
| 9,342,528 B2 * | 5/2016 | Clash | G06F 3/067 |
| 9,529,773 B2 | 12/2016 | Hussain et al. | |

(Continued)

OTHER PUBLICATIONS

Bcache, https://bcache.evilpiepirate.org/, 8 pages.

(Continued)

*Primary Examiner* — Ryan Bertram
(74) *Attorney, Agent, or Firm* — Lewis Roca Rothgerber Christie LLP

(57) ABSTRACT

Systems and methods for managing a storage system are disclosed. The storage system includes a first storage device and a second storage device different from the first storage device. A first storage operation is received for a first portion of a file, and a data structure associated with the file is identified. Based on the data structure, the first storage device is identified for the first portion of the file. The first storage operation is transmitted to the first storage device. In response to the first storage operation, the first storage device updates or accesses the first portion of the file.

20 Claims, 7 Drawing Sheets

(56) References Cited

U.S. PATENT DOCUMENTS

| | | | |
|---|---|---|---|
| 10,019,159 B2 | 7/2018 | Wires et al. | |
| 10,387,449 B2 | 8/2019 | Isherwood et al. | |
| 10,599,340 B1* | 3/2020 | Gudipati | G06F 13/18 |
| 10,620,840 B2 | 4/2020 | Freyensee et al. | |
| 10,817,218 B2 | 10/2020 | Jo | |
| 10,866,912 B2 | 12/2020 | Hayashida et al. | |
| 11,048,591 B1 | 6/2021 | Mamidi et al. | |
| 11,061,770 B1 | 7/2021 | Patel et al. | |
| 11,074,013 B2 | 7/2021 | Suri et al. | |
| 2007/0088702 A1* | 4/2007 | Fridella | H04L 61/4552 |
| | | | 709/219 |
| 2012/0096059 A1* | 4/2012 | Shimizu | G06F 3/0689 |
| | | | 707/828 |
| 2013/0198230 A1* | 8/2013 | Ochi | H04L 67/1097 |
| | | | 707/770 |
| 2014/0108723 A1* | 4/2014 | Nowoczynski | G06F 16/172 |
| | | | 711/113 |
| 2015/0088827 A1* | 3/2015 | Xu | G06F 3/0619 |
| | | | 707/634 |
| 2015/0378619 A1* | 12/2015 | Maeda | G06F 3/0635 |
| | | | 707/725 |
| 2019/0065062 A1 | 2/2019 | Knauft et al. | |
| 2019/0205058 A1* | 7/2019 | Jin | G06F 12/0811 |
| 2020/0257459 A1* | 8/2020 | Waddington | G06F 12/1081 |
| 2020/0341906 A1* | 10/2020 | Steinke | G06F 3/061 |
| 2021/0072927 A1 | 3/2021 | Yang et al. | |
| 2021/0216220 A1 | 7/2021 | Kim et al. | |
| 2021/0216459 A1 | 7/2021 | Benhanokh et al. | |
| 2021/0263762 A1 | 8/2021 | Kachare et al. | |
| 2021/0334215 A1 | 10/2021 | Gole et al. | |
| 2021/0382825 A1 | 12/2021 | Wang et al. | |
| 2022/0050630 A1 | 2/2022 | Bert | |
| 2022/0091754 A1 | 3/2022 | Raman et al. | |
| 2022/0107916 A1* | 4/2022 | Curtis-Maury | G06F 3/0604 |
| 2022/0391138 A1* | 12/2022 | Dronamraju | G06F 16/188 |

OTHER PUBLICATIONS

Chen, Ming, et al., "vNFS: Maximizing NFS Performance with Compounds and Vectorized I/O," $15^{th}$ USENIX Conference on File and Storage Technologies (FAST 17), pp. 301-314, Santa Clara, CA, Feb. 2017, USENIX Association.

Deng, Fan, et al., "SeRW: Adaptively Separating Read and Write upon SSDs of Hybrid Storage Server in Clouds," $49^{th}$ International Conference on Parallel Processing—ICPP, ICPP '20, New York, NY, USA, 2020, Association for Computing Machinery, 45 pages.

Deng, Fan et al., SeRW: Adaptively Separating Read and Write upon SSDs of Hybrid Storage Server in Clouds. In 49th International; Conference on Parallel Processing—ICPP, ICPP '20, New York, NY, USA, 2020. Association for Computing Machinery, 11 pages.

Eisenman, Assaf, et al., "Reducing DRAM Footprint with NVM in Facebook," In Proceedings of the Thirteenth EuroSys Conference, EuroSys '18, New York, NY, USA, 2018, Association for Computing Machinery, 13 pages.

Guerra, Jorge, et al., "Cost Effective Storage using Extent Based Dynamic Tiering," In Proceedings of the 9th USENIX Conference on File and Storage Technologies, FAST'11, USA, 2011, USENIX Association, 14 pages.

Hedayati, Mohammad, et al., "Multi-Queue Fair Queuing," In 2019 USENIX Annual Technical Conference (USENIX ATC 19), pp. 301-314, Renton, WA, Jul. 2019, USENIX Association.

Huang, Jian, et al., "NVRAM-aware Logging in Transaction Systems," Proceedings of the VLDB Endowment, vol. 8, No. 4, pp. 389-400, Dec. 2014.

Jiang, Song, et al., "LIRS: An Efficient Low Inter-reference Recency Set Replacement Policy to Improve Buffer Cache Performance," In Marina Del Rey, pp. 31-42, ACM Press, 2002.

Kannan, Sudarsum, et al., "Redesigning LSMs for Nonvolatile Memory with NoveLSM," In 2018 USENIX Annual Technical Conference (USENIX ATC 18), pp. 993-1005, Boston, MA, Jul. 2018, USENIX Association.

Kim, Hyojun, et al., "Evaluating Phase Change Memory for Enterprise Storage Systems: A Study of Caching and Tiering Approaches," In $12^{th}$ USENIX Conference on File and Storage Technologies (FAST 14), pp. 33-45, Santa Clara, CA, Feb. 2014, USENIX Association.

Krishnan, R. Madhava, et al., "Durable Transactional Memory Can Scale with TIMESTONE," In ASPLOS '20: Architectural Support for Programming Languages and Operating Systems, Lausanne, Switzerland, Mar. 16-20, 2020 [ASPLOS 2020 was canceled because of COVID-19], pp. 335-349, ACM, 2020.

Kwon, Youngjin, et al., "Strata: A Cross Media File System," In Proceedings of the $25^{th}$ Symposium on Operating Systems Principles, SOSP '17, Shanghai, China, 2017, 18 pages.

Li, Wenjie et al., "HiLSM: An LSM-Based Key-Value Store for Hybrid NVM-SSD Storage Systems," In Proceedings of the 17th ACM International Conference on Computing Frontiers, CF '20, p. 208-216, New York, NY, USA, 2020. Association for Computing Machinery, 9 pages.

Liu, Xin et al., "ONFS: a hierarchical hybrid file system based on memory, SSD, and HDD for high performance computers," Frontiers of Information Technology & Electronic Engineering 18. 12, 2017, pp. 1940-1971.

Megiddo, Nimrod, et al., "ARC: a Self-Tuning, Low Overhead Replacement Cache," USENIX File & Storage Technologies Conference (FAST), Mar. 31, 2003, San Francisco, CA, USENIX Association, 16 pages.

Miller, Samantha, et al., "High Velocity Kernel File Systems with Bento," In $19^{th}$ USENIX Conference on File and Storage Technologies (FAST 21), pp. 65-79, USENIX Association, Feb. 2021.

Min, Changwoo, et al., "Understanding Manycore Scalability of File Systems," In Ajay Gulati and Hakim Weatherspoon, editors, 2016 USENIX Annual Technical Conference, USENIX ATC 2016, Denver, CO, USA, Jun. 22-24, 2016, pp. 71-85, USENIX Association.

Narayanan, Dushyanth, et al., "Migrating Server Storage to SSDs: Analysis of Tradeoffs," In Proceedings of the $4^{th}$ ACM European Conference on Computer Systems, EuroSys '09, pp. 145-158, New York, NY, USA, 2009, Association for Computing Machinery.

Narayanan, Iyswarya, et al., "Getting More Performance with Polymorphism from Emerging Memory Technologies," In Proceedings of the $12^{th}$ ACM International Systems and Storage Conference (SYSTOR '19), pp. 8-20, New York, NY, USA, 2019, Association for Computing Machinery.

Ren, Yujie, et al., "CrossFS: A Cross-layered Direct-Access File System," In $14^{th}$ USENIX Symposium on Operating Systems Design and Implementation (OSDI 20), pp. 137-154, USENIX Association, Nov. 2020.

Ren, Yujie, et al., "CompoundFS: Compounding I/O Operations in Firmware File Systems," In $12^{th}$ USENIX Workshop on Hot Topics in Storage and File Systems (HotSTorage 20), USENIX Association, Jul. 2020, 8 pages.

Rbtree based iterval tree as a prio_tree replacement, https://1wn.net/Articles/509994/, 2012, 3 pages.

RocksDB, http://rocksdb.org/.

Shin, Woong, et al., "Data Jockey: Automatic Data Management for HPC Multi_Tiered Storage Systems," In 2019 IEEE International Parallel and Distributed Processing Symposium (IPDPS), pp. 511-522, 2019.

Van Renen, Alexander, et al., "Managing Non-Volatile Memory in Database Systems," In Proceedings of the 2018 International Conference on Management of Data, SIGMOD '18, pp. 1541-1555, New York, NY, USA, 2018, Association for Computing Machinery.

Waldspurger, Carl, et al., "Cache Modeling and Optimization using Miniature Simulations," In 2017 USENIX Annual Technical Conference (USENIX ATC 17), pp. 487-498, Santa Clara, CA Jul. 2017, USENIX Association.

Wang, Shucheng, et al., "BCW: Buffer-Controlled Writes to HDDs for SSD-HDD Hybrid Storage Server," In $18^{th}$ USENIX Conference on File and Storage Technolgoies (FAST 20), pp. 253-266, Santa Clara, CA, Feb. 2020, USENIX Association.

Matthew Wilcox and Ross Zwisler. Linux DAX, https://www.kernel.org/doc/Documentation/filesystems/dax.txt.

(56) References Cited

OTHER PUBLICATIONS

Wu, Kan, et al., "The Storage Hierarchy is Not a Hierarchy: Optimizing Caching on Modern Storage Devices with Orthus," *In 19th USENIX Conference on File and Storage Technologies (FAST 21)*, pp. 307-323, USENIX Association, Feb. 2021.

Xie, Wei, et al., "Two-Mode Data Distribution Scheme for Heterogeneous Storage in Data Centers," IEEE International Conference on Big Data (Big Data), 2015, pp. 327-332.

Yang, Jian, et al., "An Empirical Guide to the Behavior and Use of Scalable Persistent Memory," *In 18th USENIX Conforerence on File and Storage Technologies (FAST 20)*, pp. 169-182, Santa Clara, CA, Feb. 2020, USENIX Association.

Zhang, Jian et al., "FusionFS: Fusing I/O Operations using $CISC_{Ops}$ in Firmware File Systems," 20th USENIX Conference on File and Storage Technologies (FAST 22), pp. 297-312, Santa Clara, CA, Feb. 2022. USENIX Association.

Zheng, Shengan, et al., "Ziggurat: A Tiered File System for Non-Volatile Main Memories and Disks," *In 17th USENIX Conference on File and Storage Technologies (FAST 19)*, pp. 207-219, Boston, MA, Feb. 2019, USENIX Association.

EPO Extended European Search Report dated Jul. 6, 2023, issued in corresponding European Patent Application No. 23159697.4 (10 pages).

\* cited by examiner

SYSTEMS AND METHODS FOR HETEROGENEOUS STORAGE SYSTEMS

CROSS-REFERENCE TO RELATED APPLICATION(S)

The present application claims priority to and the benefit of U.S. Provisional Application No. 63/316,403, filed Mar. 3, 2022, entitled "SYSTEMS, METHODS, AND DEVICES FOR HETEROGENEOUS STORAGE SYSTEMS," and claims priority to and the benefit of U.S. Provisional Application No. 63/350,818, filed Jun. 9, 2022, entitled "UNIFIED I/O LIBRARY FOR HETEROGENEOUS STORAGE SYSTEMS," and claims priority to and the benefit of U.S. Provisional Application No. 63/355,377, filed Jun. 24, 2022, entitled "UNIFYING HETEROGENEOUS STORAGE SYSTEMS WITH HETEROGENEOUS I/O," the entire content of each of which is incorporated herein by reference.

FIELD

One or more aspects of embodiments according to the present disclosure relate to storage systems, and more particularly to management of heterogeneous storage systems.

BACKGROUND

Big data applications may generate large data sizes that may need to be quickly accessed and/or processed. Growth of such big data applications may pose challenges to traditional storage systems.

The above information disclosed in this Background section is only for enhancement of understanding of the background of the present disclosure, and therefore, it may contain information that does not form prior art.

SUMMARY

Embodiments of the present disclosure are directed to a method for managing a storage system comprising a first storage device and a second storage device different from the first storage device. The method includes receiving a first storage operation for a first portion of a file; identifying a data structure associated with the file; identifying, based on the data structure, the first storage device for the first portion of the file; and transmitting the first storage operation to the first storage device, wherein in response to the first storage operation, the first storage device updates or accesses the first portion of the file.

According to some embodiments, the data structure includes a tree data structure having a first node and a second node, wherein the first node includes first information on the first portion of the file, and the second node includes second information on a second portion of the file, wherein the second portion of the file is stored in the second storage device.

According to some embodiments, the first information identifies first metadata in a first file system, and the second information identifies second metadata in a second file system different from the first file system.

According to some embodiments, the file is a logical file in a virtual namespace, wherein the logical file abstracts the first file system and the second file system, from an application.

According to some embodiments, the first storage operation is directed to the virtual namespace, and the method comprises receiving a second storage operation directed to the virtual namespace; identifying a second storage device; and transmitting the second storage operation to the second storage device.

According to some embodiments, the method further comprises receiving a second storage operation for a second portion of the file; identifying the data structure associated with the file; identifying, based on the data structure, the second storage device for the second portion of the file; and transmitting the second storage operation to the second storage device, wherein in response to the second storage operation, the second storage device updates the second portion of the file concurrently with the first storage device updating the first portion of the file.

According to some embodiments, the method further comprises identifying a first processing thread assigned to the first storage device; determining throughput of the first processing thread; and reassigning the first processing thread to the second storage device based on the throughput.

According to some embodiments, the method further comprises calculating utilization of a processing resource by the first processing thread; determining availability of the processing resource in a first processing set; and borrowing the processing resource from a second processing set in response to the determining.

According to some embodiments, the first portion of the file includes a first block of data of the file, and the second portion of the file includes a second block of data of the file.

According to some embodiments, the first storage device is a non-volatile memory device, and the second storage device is a solid state drive.

Embodiments of the present disclosure are further directed to a system for managing a storage system comprising a first storage device and a second storage device different from the first storage device. The system comprises a processor and memory. The memory stores instructions that, when executed by the processor, cause the processor to: receive a first storage operation for a first portion of a file; identify a data structure associated with the file; identify, based on the data structure, the first storage device for the first portion of the file; and transmit the first storage operation to the first storage device, wherein in response to the first storage operation, the first storage device updates or accesses the first portion of the file.

These and other features, aspects and advantages of the embodiments of the present disclosure will be more fully understood when considered with respect to the following detailed description, appended claims, and accompanying drawings. Of course, the actual scope of the invention is defined by the appended claims.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

DETAILED DESCRIPTION

Figure 1:
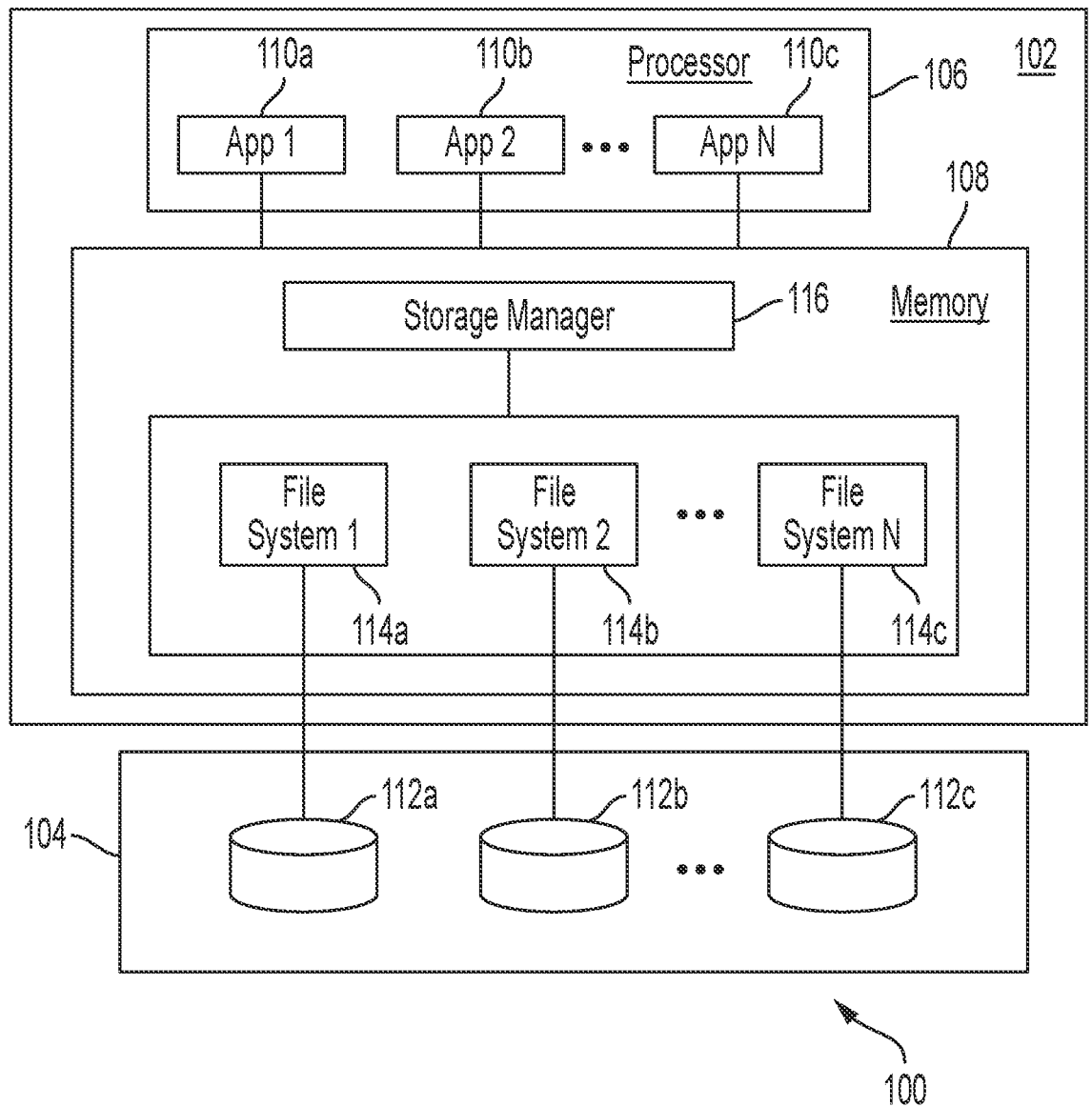
FIG. 1 is a block diagram of a computing system including a host computing device coupled to a heterogeneous storage system according to one embodiment.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, in the drawings, the relative sizes of elements, layers, and regions may be exaggerated and/or simplified for clarity.

Large-scale systems may be need to quickly access and process large amounts of data. In efforts to address this need, an input and/or output (I/O) hardware storage stack may be implemented in a heterogeneous manner. The heterogeneous storage system may include different, heterogeneous storage devices such as, for example, a fast, but more expensive, storage device, such as a persistent memory (PM), along with slower, but higher-capacity device, such as a Nonvolatile Memory Express (NVMe) solid-state drive (SSD), or a mechanical drive.

Some current art systems may manage storage heterogeneity by employing techniques like caching or tiering. In one caching approach, the faster storage (e.g. PM) may be used as a cache, and the slower storage device (e.g., SSD or hard disk), may be used as backup storage. In one tiering approach, usage of data is evaluated for determining placement of data in the different storage devices. For example, data may be evaluated so that active or frequently accessed data (also referred to as "hot" data) is placed in faster storage, and inactive or less frequently accessed data (also referred to as "cold" data) is placed in slower storage.

Although current art systems are useful in managing heterogeneous storage devices, they suffer drawbacks in terms of maximizing I/O performance, reducing I/O amplification, and/or the like. For example, current art solutions may be restricted to using a single storage (e.g. faster storage) along the critical path, failing to exploit the cumulative bandwidth provided by the other storage devices. For example, in caching solutions, all updates may happen to a fast storage device. In tiering solutions, hot and cold objects (or files) could be concurrently accessed from fast and slow storage devices; however, accessing multiple hot or cold objects in a fast or slow storage device may still be restricted to a single storage device, thereby preventing cumulative bandwidth usage.

Another drawback with current art systems is high I/O amplification that may result in the same data being written or read from the multiple storage devices. Tiering mechanisms may also suffer from rigid data movement policies that may require movement of entire files or objects across the various storage devices.

In general terms, embodiments of the present disclosure are directed to systems and methods for managing I/O requests (e.g. data accesses/reads and placements/writes) in a heterogeneous storage system. In one embodiment, a heterogeneous storage manager provides a unified namespace for the different storage devices that abstracts out the different file system namespaces and/or storage devices, from the applications accessing the storage devices.

The I/O requests from the applications may be directed to a logical file in the unified namespace. Portions of the logical file, however, may be stored as separate files in the different file systems of the different storage devices. Having the unified namespace may therefore allow the storage manager to transparently utilize both storage devices without changing their file systems. The separate files may be accessed via a library-level data structure, such as an indirection table, that may provide the logical file's current storage location(s).

In one embodiment, the storage manager allows for fine-grained placement or movement of a data block, or range of blocks (e.g., file extents) across different storage media, in a concurrent manner. This helps achieve cumulative bandwidth across the different storage media. In one embodiment, the storage manager maintains information about a block of a file that is to be updated or accessed by one or more threads, in a tree data structure. The tree data structure may be, for example, an interval tree that is indexed by interval ranges.

In one embodiment, the interval tree is used for conflict resolution. For example, the interval tree may be used to identify an I/O request from one application thread, that may conflict with requests from other application threads. The storage manager may create the interval tree during the creation of the file. In one embodiment, processes or threads that share the file may also share the file's interval tree.

In one embodiment, the application thread transmitting an I/O request to update a block/range of the file may acquire a global read-write lock of the interval tree. The application thread may locate the node of the tree containing the block/range to make for making an update of the node, or generate a new tree node that may be indexed by the block/range of the request.

Once the interval tree node is updated, the I/O request for the block/range is dispatched to the storage device based on a physical file descriptor for the device. The physical file descriptor may be stored in the interval tree. In one embodiment, during the dispatch of the I/O request, a per-node lock is acquired, releasing the global read-write lock. This allows multiple threads to perform I/O on disks for disjoint block ranges concurrently.

In one embodiment, the storage manager is configured to dynamically adjust the placement of data blocks across one or more of the storage devices, according to I/O traffic. Such a dynamic placement policy may allow effective utilization of multiple storage devices and effective utilization of one or more central processing units (CPUs) across the multiple storage devices. For example, threads with substantially high CPU utilization may be dynamically allocated more CPU resources than threads with substantially low CPU utilization, and vice versa. When compared to a static data placement policy where a static number of CPUs are assigned to each storage device regardless of current I/O traffic, the dynamic CPU assignment may help avoid underutilization of the one or more CPUs.

In one embodiment, the storage manager further provides for substantially lightweight crash consistency across multiple storage devices. In this regard, the interval trees may be persistent interval trees to which application threads may directly add or update the interval tree range for durability and recovery. In one embodiment, the nodes of the tree are allocated from a contiguous memory-mapped region in non-volatile memory (NVM). Each interval tree node may point to a next node using a physical offset relative to a starting address of the root node instead of using a virtual address. Iterating the persistent interval tree nodes may require an offset to the root node from the starting address of the mapped region. In the event of failure, the persistent interval tree may be remapped using the offset of the root node in a log, and other interval tree nodes may be recovered.

FIG. 1 is a block diagram of a computing system 100 including a host computing device 102 coupled to a heterogeneous storage system 104 according to one embodiment. The computing system 100 may be a desktop computer, laptop computer, network server, mobile device, embedded computer, and/or the like.

The host computing device 102 may include a processor 106 and a memory 108. The processor 106, also referred to as a central processing unit (CPU), may include one or more processing cores configured to execute program instructions stored in the memory 108. In one embodiment, the processor 106 is configured to execute one or more software applications and/or processing threads 110a-110c (collectively referenced as 110). The applications/threads 110 may provide I/O requests (e.g. read requests, write requests, etc.) for the storage system 104.

The memory 108 of the host computing device 102 may include one or more volatile and/or non-volatile memory including, but not limited to random access memory (RAM) (e.g. dynamic random access memory (DRAM)), read-only memory (ROM), and/or the like. The memory may store instructions for performing various operations, including management operations of the storage system 104. The management operations may include reading data, writing data, or erasing data of the storage system 104, and/or other like operations.

In one embodiment, the heterogeneous storage system 104 includes one or more storage devices 112a-112c (collectively referenced as 112). In one embodiment, at least one of the storage devices 112 is heterogeneous from another one of the storage devices. In this regard, at least one of the storage devices 112 has a different storage characteristic (e.g. bandwidth, latency, capacity, and the like) from another one of the storage devices. The storage devices 112 included in the heterogeneous storage system 104 may include, without limitation, a non-volatile memory (e.g., PM), an SSD (e.g. NVMe SSD), hard disk drive (HDD), and/or the like. The different storage devices 110 may have a corresponding file system 114a-114c (collectively referenced as 114). The file system 114 may store metadata for a file for controlling how the file is stored and retrieved from the corresponding storage device 112.

In one embodiment, the various management operations of the heterogeneous storage system 104 is performed by a storage manager 116. For example, the storage manager 116 may determine where data is to be placed in the heterogeneous storage system 104, and the level of granularity of the data placement. The storage manager 116 may be implemented as middleware software that is stored in a user or kernel space of the memory 108, for managing communication between the applications 110 and the storage system 104. The management of the storage system 104 by the storage manager 116 may be transparent to the applications 110.

In one embodiment, the storage manager 116 provides one or more unified namespaces that decouple the applications 110 from the file systems 114 and/or storage devices 112. In this regard, the storage manager 116 provides a single directory structure that may span one or more of the storage devices 112, while allowing the storage devices to maintain their own file systems 114. For example, the storage manager 116 may store different portions of an overall file, in different ones of the heterogeneous storage devices 112, but present the various portions as a single logical file in the unified namespace (e.g. in the single directory structure). The application 110 may then direct read and write commands to the logical file based on a file descriptor in the unified namespace.

In one embodiment, the storage manager 116 is configured to employ a fine-grained data placement policy that may help exploit the cumulative storage bandwidth of the heterogeneous storage devices 112. The fine-grained data placement policy may be at a byte-level, block-level, and/or the like. In one embodiment, the storage manager maintains a data structure for a logical file. The data structure may store mapping information between a portion of the logical file (e.g. a byte, a block, or range of bytes or blocks), to the corresponding storage device. The data structure may allow the multiple applications/threads 110 to concurrently access different portions of the logical file across the heterogeneous storage devices 112, allowing the cumulative storage bandwidth of the storage system 104 to be exploited.

In one embodiment, the data structure is a persistent data structure that supports crash consistency and durability of the data structure. In this regard, the nodes of the data structure may be allocated from a contiguous memory-mapped region in the NVM. The interval tree node may point to a next node using a physical offset relative to a starting address of a root node instead of using a virtual address. In the event of failure, the persistent data structure may be remapped using the offset stored in a log.

In one embodiment, the storage manager 110 is configured with a dynamic data placement policy for load balancing and for maximizing the storage write bandwidth of the heterogeneous storage devices 112. In regards to load balancing, the dynamic data placement may collect I/O throughput information to reassign the I/O to different storage devices based on load considerations. The dynamic data placement policy may further allow reallocating of CPU resources that process the I/O operations to maximize use of the CPU resources.

For example, when a static data placement policy is employed instead of the dynamic data placement policy, one or more CPU cores of the processor 106 may be statically assigned to one of the storage devices 112 for processing write operations for the storage device. Due to the static assignment, the one or more CPU cores may not be used by the other storage devices even when the one or more CPU cores are inactive, which may lead to underutilization of the one or more CPU cores.

In one embodiment, dynamic scheduling of the CPU cores of the processor 106 allows a storage device 112 with a substantially high CPU utilization to have more CPU resources allotted to the device, than a storage device with a low CPU utilization. In this regard, the storage manager 110 is configured to collect aggregate I/O throughput of the various CPU resources, and dynamically reassign substantially inactive CPU resources assigned to one of the storage devices 112 (e.g. NVM storage), to another one of the storage devices (e.g. SSD). The dynamic CPU assignment may occur when a memory cache of the memory is full, and data needs to be placed into one of the storage devices 112.

Figure 2:
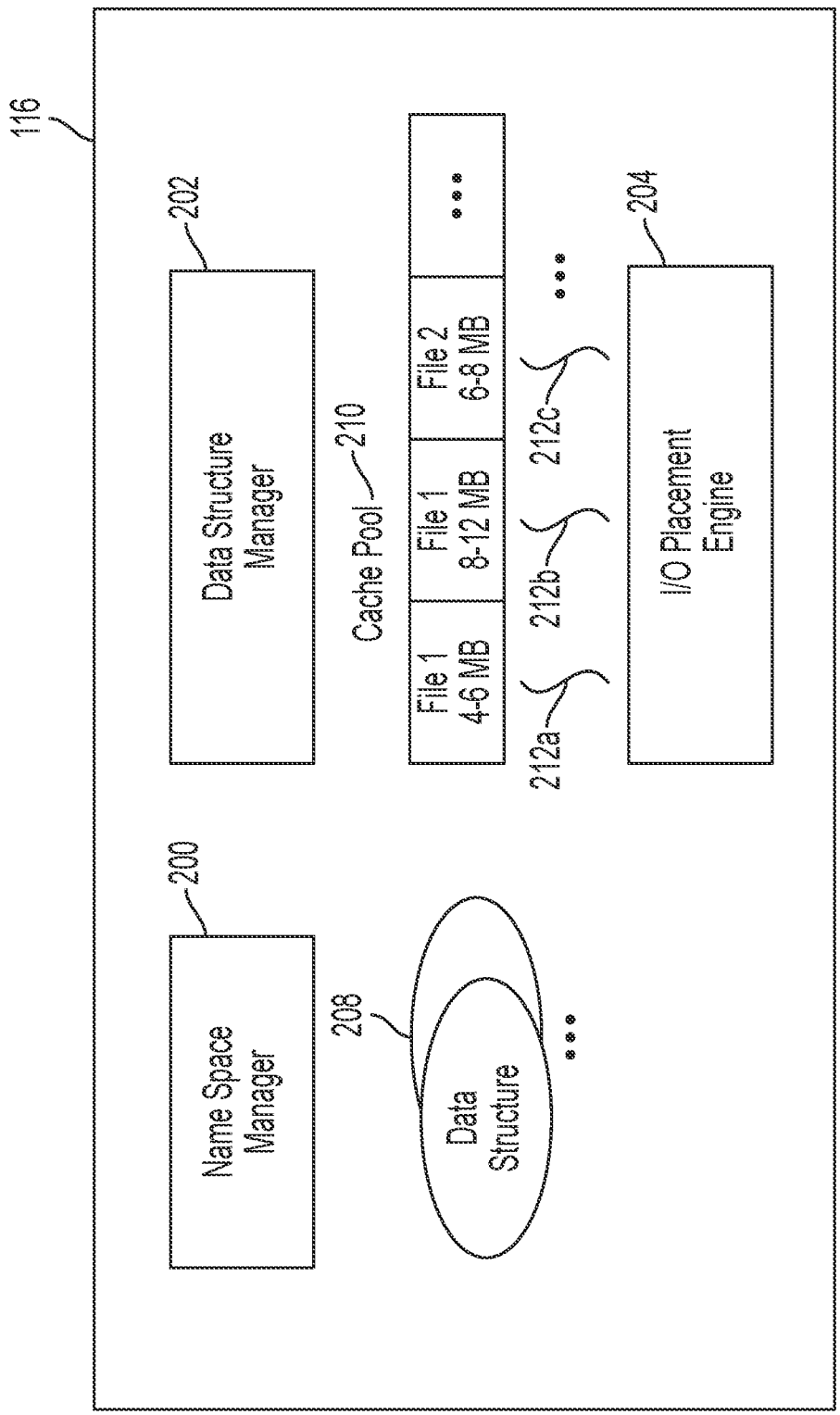
FIG. 2 is a block diagram of a heterogeneous storage manager according to one embodiment.

FIG. 2 is a block diagram of the heterogeneous storage manager 116 according to one embodiment. The storage manager 116 includes, without limitation, a namespace manager 200, data structure manager 202, and I/O placement engine 204. Although the various components of FIG. 2 are assumed to be separate functional units, a person of skill in the art will recognize that the functionality of the components may be combined or integrated into a single component, or further subdivided into further sub-components without departing from the spirit and scope of the inventive concept.

The namespace manager 200 may be configured to provide one or more unified namespaces to the applications 110 for abstracting out the physical location(s) of a file. In some embodiments, the namespace manager 200 provides a first unified namespace for a first logical file system, and a second unified namespace for a second logical file system. The applications 110 may direct I/O requests to the first unified namespace and/or the second unified namespace.

In one embodiment, when an application 110 creates a new file, the namespace manager 200 generates a logical file with a logical filename, in a logical file system. Different portions of the file, however, may be stored in different physical locations (e.g., in different heterogeneous storage devices 112) as separate, physical files. In one embodiment, the application 110 is returned the name/descriptor of the logical file, for abstracting out the physical files in the different storage devices 112 that may store the different portions of the file. The application 110 may direct I/O requests/commands (e.g., read/write commands), to the logical file.

In one embodiment, the data structure manager 202 generates a data structure 208 for a logical file when the file is generated by an application 110. The data structure 208 may be associated with a logical filename in the unified namespace. Applications 110 that share the logical file may also share the file's data structure 208. The data structure 208 may be, for example, a tree structure.

In one embodiment, the data structure identifies where different portions of the logical file are stored across the heterogeneous storage devices 112. One or more of the heterogeneous storage devices 112 may generate file metadata about the physical file that stores the portion of the logical file. The file metadata may be stored in the filesystem 114 corresponding to the storage device 112. The metadata may be stored in an index node (inode), although embodiments are not limited thereto. The metadata may identify physical locations of one or more blocks of the physical file in the storage device 112.

In one embodiment, the data structure 208 is used for conflict resolution. For example, the data structure 208 may be used to identify an update to a block/range of a file that conflicts with requests from other threads. A global read-write lock may be used to resolve the conflict. In this regard, the thread that obtains the global read-write lock may update the data structure 208 for the block/range of the file that is to be updated. During dispatch of the I/O request, the thread may obtain a lock of the node containing the block/range of the file that is to be updated (referred to as a per-node lock), releasing the global read-write lock.

In one embodiment, the data structure manager 202 provides for crash consistency and durability. In this regard, the data structure manager 202 allows for multiple levels of durability across the different storage devices 112. For example, when spreading data across the different storage devices 112, a first type of data storage device may provide weaker data durability than a second type of data storage device, but stronger data durability than a third type of data storage device. In this case, a minimum granularity model may be employed to provide a least metadata durability for a file that is stored across the first, second and third type of data storage devices. Alternatively, data (e.g., database data) that may expect maximum data durability may be logged to the type of data storage device that supports the maximum data durability.

To provide maximum durability for cache pages used for SSD, an append-only logging protocol may be employed for the crash consistency, and to prevent data loss from volatile processor caches issuing persistent writes using a cache line write back (CLWB) and memory fence. A commit flag may be set after a request is added to the 10 queue. After a failure, requests with an unset commit flag may be discarded during recovery.

In some embodiments, the data structure manager 202 allows for crash consistency and durability of the data structure 208 generated for a file, and of data stored in the cache 210. In one embodiment, the data structure 208 is a persistent data structure to which applications threads can directly add or update with durability and recovery. In this regard, the nodes of the data structure may be allocated from a contiguous memory-mapped region in NVM. A node of the data structure 208 may point to a next node using a physical offset relative to a starting address of a root node instead of using a virtual address. In the event of failure, the persistent data structure may be remapped using the offset stored in a log.

In one embodiment, the I/O placement engine 204 is configured with a data placement algorithm for placing/writing data across one or more of the heterogeneous storage devices 112. The data placement mechanism may be invoked when a cache 210 that stores data generated by the various applications 110 is full. In this case, the I/O placement engine 204 may invoke the data placement algorithm to move at least some of the data in the cache 210, to one or more of the heterogeneous storage devices 112. In this regard, OS-level virtual file systems and caching layers for block file systems may impose scalability bottlenecks with coarse-grained node-level locking that may prevent multiple threads from simultaneously operating on files. The unified namespace and metadata management layer provided by the storage manager 116 that manages both fine-grained data-placement and cached data in DRAM may help address the bottleneck issues. In this regard, to reduce the bottlenecks of OS-level caching, embodiments of the present disclosure provide a scalable application-level caching that may address the concurrency bottlenecks of OS caching and the overheads of user-level to OS context switches.

In one embodiment, the I/O placement engine 204 determines the granularity of the data that is to be stored in the different storage devices 112, and/or the type of storage device that is to store the data. In one embodiment, the data placement algorithm may allow data to be placed at a substantially fine-grained level (byte-level, block-level, etc.) for allowing different bytes, blocks, or block ranges of the logical file to be accessed concurrently by the multiple applications/threads 110.

In one embodiment, the data placement algorithm considers factors such as load and performance characteristics of the storage devices 112 (e.g., bandwidth, latency, and the like) in determining how and where to store the different portions of a file. For example, a hot portion of a file that is accessed frequently may be stored in an NVM while a cold portion of the file may be stored in SSD. In another example, if there are more threads reading and writing to a first storage device than a second storage device, one or more blocks of a file may be stored in the second storage device over the first storage device. Based on these factors, the data placement algorithm may dynamically place a first I/O request directed to a namespace to a first storage device, and a second I/O request directed to the namespace to a second storage device.

In one embodiment, the I/O placement engine 204 is configured to manage utilization of CPUs across the heterogeneous storage devices 112. In one embodiment, the data placement algorithm dynamically assigns CPU resources to one or more processing threads 112a-112c (collectively referenced as 112) that issue I/O requests to the storage devices 112. For example, the I/O request may be to place data in the cache 210 in the storage devices 112.

In one embodiment, the data placement algorithm is for maximizing write bandwidth of the heterogeneous storage system 104. In this regard, the processing threads 212 may be assigned to one or more of the storage devices 112 to write data to the assigned storage (e.g. during an append operation). If one of the processing threads 212 that is assigned to a first one of the storage devices 112 (e.g., a relative fast storage device) is less active than a threshold amount in issuing I/O requests, the thread may be assigned to a second one of the storage devices (e.g., a relatively slow storage device). After the threads are assigned to a specific type of storage, CPU resources may be allocated to the threads. In this regard, the CPU resources are split into two CPU sets—a fast CPU set and a slow CPU set. The set from which CPU resources are allocated to a thread may depend on whether the thread is assigned to a fast storage or a slow storage. If there are more threads that are assigned to a fast storage than the number of CPUs in the fast set, the I/O placement engine may borrow CPUs from the slow set as long as a minimum number of CPUs remain in the slow set.

Figure 3:
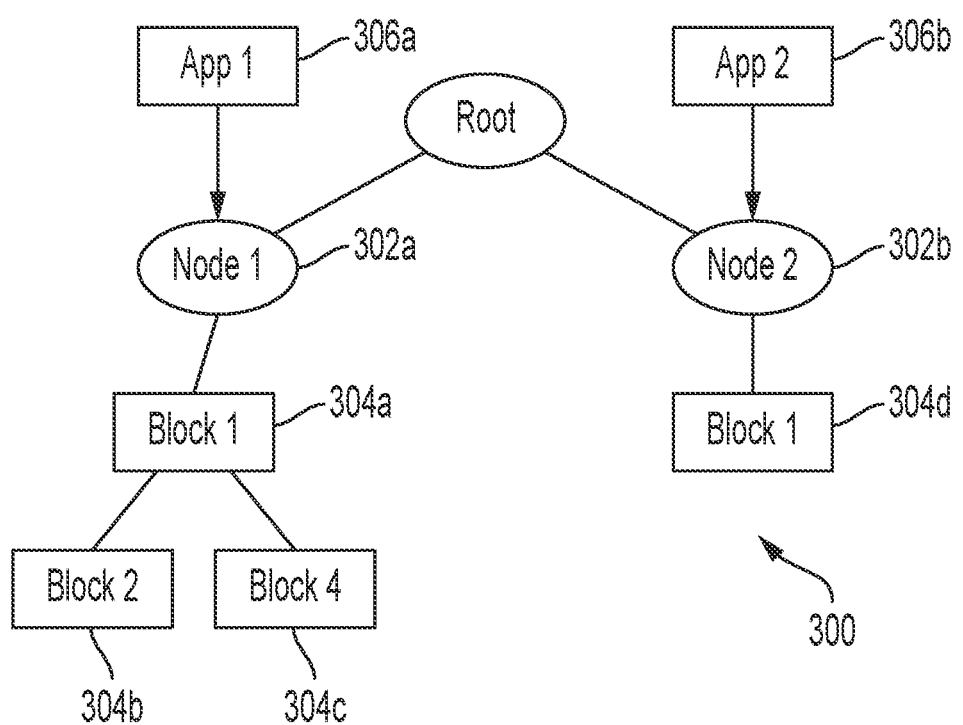
FIG. 3 is a conceptual diagram of a data structure generated by a data structure manager for a logical file according to one embodiment.

FIG. 3 is a conceptual diagram of a data structure 300 generated by the data structure manager 202 for a logical file according to one embodiment. The data structure 300 may be similar to the data structure 208 of FIG. 2.

In one embodiment, the data structure 300 is a tree data structure with one or more nodes 302a, 302b (collectively referenced as 302). More specifically, the data structure may be an interval tree, where the nodes 302 of the tree may represent a physical file in a storage device 112. The physical file may store a portion of an overall logical file. For example, the first node 302a may represent a first physical file in a first storage device 112 (e.g., NVM), while a second node 302b may represent a second physical file in a second storage device (e.g., SSD). The first and second physical files may be represented as a single logical file in a virtual filesystem. In one embodiment, the node 302 stores a link to metadata stored in the filesystem 114 that corresponds to the storage device storing the corresponding physical file.

In one embodiment, the node 304 of the tree includes an interval range having a low value and a high value. The interval range may represent the range of data blocks 304a-304d (collectively referenced as 304) that are included in the node 304. One or more of the data blocks 304 may store an offset and a size range that may be mapped to one or more corresponding data blocks of the physical file in the corresponding storage device 112. For example, data blocks 304a-304c may store offsets and size ranges that may be linked to one or more data blocks in the first storage device (e.g. NVM), and data block 304d may store an offset and a size range that may be linked to a range of data blocks (e.g., file extents) in the second storage device (e.g. SSD).

In one embodiment, one or more applications/processing threads 306a, 306b (collectively referenced as 306) may issue one or more I/O requests directed to the logical file. In one embodiment, the I/O requests are processed by the storage manager 116. The one or more applications 306 may be similar to the applications 110 of FIG. 1, and/or the processing threads 212 of FIG. 2.

In one embodiment, the storage manager 116 processes the I/O requests for identifying the data structure 300 corresponding to the logical file of the I/O request. The data structure may be used for determine whether the I/O request conflicts with an I/O request from another one of the processing threads 306. In one embodiment, the processing thread 306 that acquires a global-read-write lock may update the data structure 300. The processing thread 306 may update the data structure by adding, for example, a data block of an I/O request that is present in the data structure 300. The data block may be added to one of the nodes 302 based on the placement algorithm of the I/O placement engine 204.

In one embodiment, the global read-write lock is released, and a per-node lock acquired, when the I/O request is dispatched to the storage device 112 that is mapped to the data block corresponding the I/O request. This may allow multiple applications to perform I/O operations on the storage devices 112 for disjoint block ranges, in a concurrent manner, overcoming concurrency bottlenecks of the underlying file systems 114. For example, in the example of FIG. 3, processing thread 306a may perform an I/O operation for data block 304a, concurrently with processing thread 306b performing an I/O operation for data block 304d.

Figure 4:
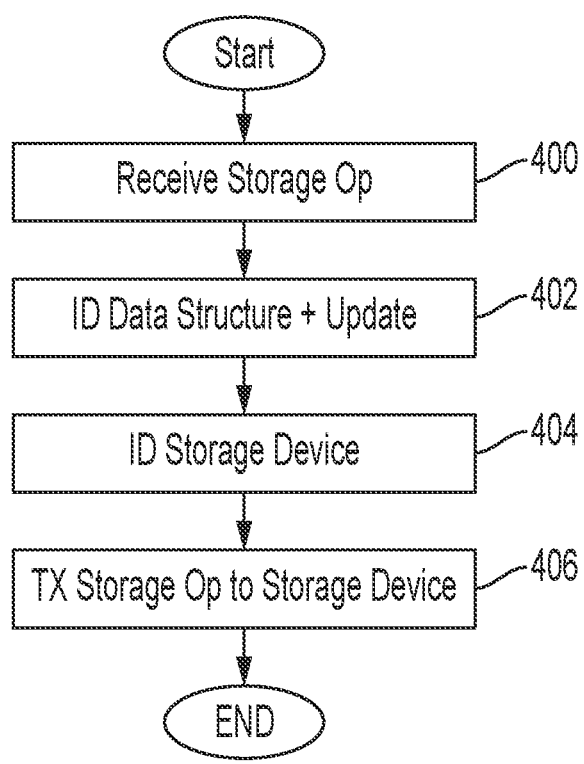
FIG. 4 is a flow diagram for processing a storage operation according to one embodiment.

FIG. 4 is a flow diagram for processing a storage operation according to one embodiment. The storage operation may be, for example, a read or write operation by one of the applications 306, for a portion of a logical file in a virtual filesystem. The process starts, and in act 400, the storage manager 116 receives the storage operation for the portion of the logical file.

In act 402, the storage manager 116 identifies the data structure 300 (e.g. tree structure) associated with the logical file. The application 306 may search the data structure 300 for a node (similar to node 302) containing the portion of the logical file (e.g., similar to data block 304) for the storage operation, and perform an update of the data structure. The update may be, for example, generating a new node and/or data block corresponding to the portion of the logical file associated with the storage operation, or updating an existing node and/or data block. For example, a file containing multiple user information may be updated to change the information for one of the users. This may cause update of an existing data block. In another example, an existing node may be updated if the data block associated with the node has moved to a different location. In one embodiment, the application 306 acquires a global read-write lock of the data structure when updating the interval tree node.

In act 404, the storage manager 116 identifies, based on the data structure, the storage device 112 and/or a block/range of blocks in the storage device 112, that are mapped to the portion of the logical file to which the storage operation is directed.

In act 406, the storage operation is routed to the storage device for execution. For example, the storage manager 116 may add the storage operation to an I/O queue. A controller of the storage device 112 may retrieve the storage operation from the I/O queue, and output a result (e.g., read or write result) in response. In one embodiment, the global read-write lock is released, and a per-node lock is acquired for the node containing the affected data block, when the storage operation is routed to the storage device. In this manner, another application may concurrently perform another storage operation on a different data block range.

Figure 5:
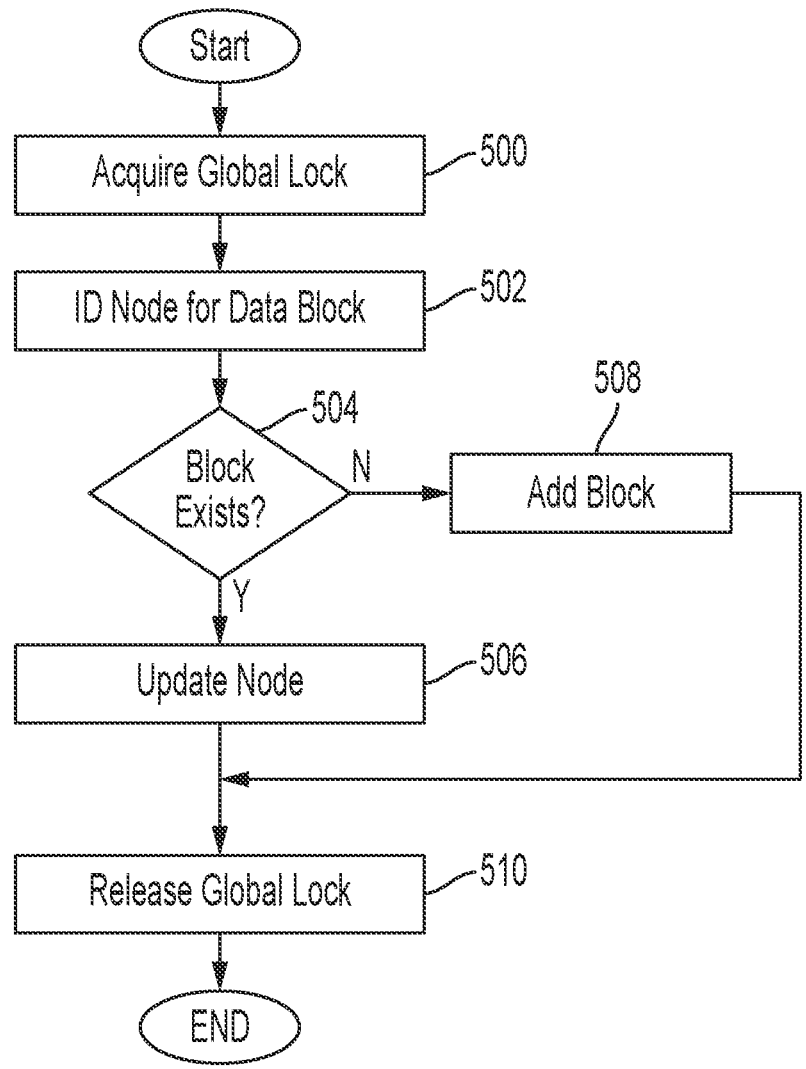
FIG. 5 is a flow diagram of a process for updating the data structure of FIG. 3 based upon an I/O request associated with one or more data blocks according to one embodiment.

FIG. 5 is a flow diagram of a process for updating the data structure 300 based upon an I/O request associated with one or more data blocks 304 according to one embodiment. In act 500, the accessing application 306 acquires a global read-write lock of the data structure 300. If the read-write lock is not available, the application 306 may wait to perform the update until the lock becomes available.

In act 502, the application 110 traverses the data structure 300 in search of a node 302 containing a data block 304 corresponding to the I/O request.

In act 504, the application 110 determines whether such a data block exists. If the answer is YES, the application updates the corresponding node in act 506. The update may include, for example, placement location, timestamp, and/or the like.

If the data block does not exist, the application 110 adds, in act 508, a new data block having a range interval corresponding to the I/O request. The placement of the new data block in one of the storage devices 112 may depend on the placement algorithm executed by the I/O placement engine 204.

In act 510, the update to the data structure 300 is complete, and the application 110 releases the global read-write lock.

Figure 6:
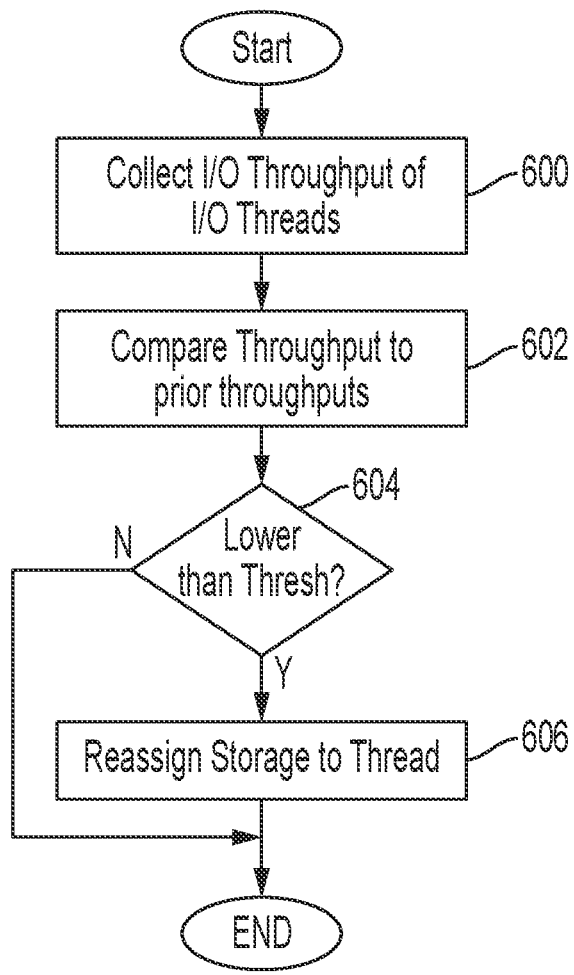
FIG. 6 is a flow diagram of a process for dynamic I/O placement according to one embodiment.

FIG. 6 is a flow diagram of a process for dynamic I/O placement according to one embodiment. The process may be executed, for example, by the I/O placement engine 204, on a periodic basis referred to as epochs. Each epoch may be, for example, a one second interval.

In act 600, the I/O placement engine 204 collects aggregated I/O throughput of one or more I/O threads (e.g. processing threads 306). For example, the I/O placement engine 204 may count a number of I/O requests by the one or more I/O threads during a current epoch. The one or more I/O threads may be assigned issue I/O requests to one or more of the different storage devices 112. For example, a first one of the application threads 212a (FIG. 3) may be assigned to issue I/O requests to a relatively fast storage such as, for example an NVM device, while a second one of the application threads 212b may be assigned to issue I/O requests to a relatively slow storage such as, for example, an NVMe SSD device.

In act 602, the I/O placement engine 204 compares the current throughput of the one or more I/O threads to prior throughputs. For example, the I/O placement engine 204 may compare the throughput of one of the I/O threads in a current epoch, to the throughput of the I/O thread in one or more prior epochs.

In act 604, the I/O placement engine 204 determines whether the current throughput of one of the I/O threads is lower than prior throughputs. If the answer is YES, the I/O placement engine 204 reassigns the thread to another storage device. For example, if an I/O thread assigned to a relatively fast storage is substantially inactive in issuing I/O requests, the I/O thread may be reassigned to a relatively slow storage. In another example, if an I/O thread assigned to a relatively slow storage is substantially active in issuing I/O requests, the I/O thread may be reassigned to a relatively fast storage. This may help maximize, for example, the storage write bandwidth of the different storage devices 112.

Figure 7:
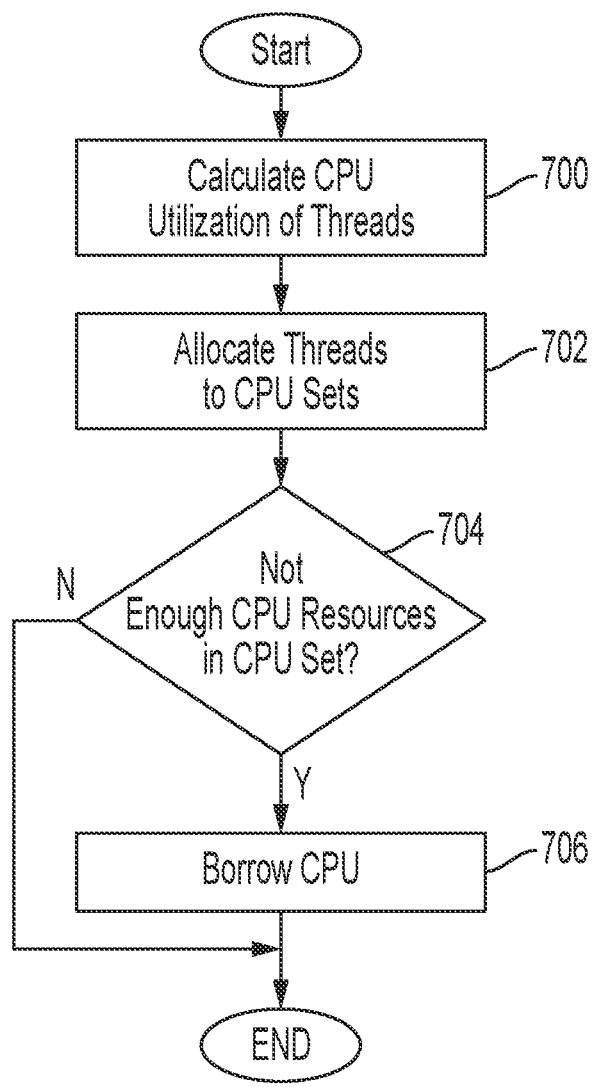
FIG. 7 is a flow diagram of a process for dynamically allocating CPU resources to an I/O thread according to one embodiment.

FIG. 7 is a flow diagram of a process for dynamically allocating CPU resources to an I/O thread according to one embodiment. In one embodiment, the CPU resources are divided into two CPU sets, although embodiments are not limited thereto. For example, the CPU resources may be divided into a first (e.g., fast) CPU set and a second (e.g., slow) CPU set.

In act 700, the I/O placement engine 204 calculates CPU utilization of the one or more I/O threads.

In act 702, the I/O placement engine 204 allocates the one or more I/O threads to one of the CPU sets. For example, the I/O placement engine 204 may allocate an I/O thread that is assigned to a first type of storage (e.g., fast storage), to the first (e.g., fast) CPU set, and allocate an I/O thread that is assigned to a second type of storage (e.g., slow storage), to the second (e.g., slow) CPU set.

In act 704, a determination is made as to whether there are enough CPU resources in the CPU set to be allocated to the I/O threads. For example, the I/O placement engine 204 may determine whether there more threads assigned to the first storage type that need CPU resources from the first CPU set. If the answer is YES, the I/O placement engine 204 borrows, in act 706, one or more CPU resources from the second CPU set to be allocated to the threads that need CPU resources. In one embodiment, the borrowing may be possible as long as there is a threshold minimum number of CPU resources left in the second CPU set.

In some embodiments, the systems and methods for managing I/O requests in a heterogeneous storage system discussed above, are implemented in one or more processors. The term processor may refer to one or more processors and/or one or more processing cores. The one or more processors may be hosted in a single device or distributed over multiple devices (e.g. over a cloud system). A processor may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processor, as used herein, each function is performed either by hardware configured, i.e., hard-wired, to perform that function, or by more general-purpose hardware, such as a CPU, configured to execute instructions stored in a non-transitory storage medium (e.g. memory). A processor may be fabricated on a single printed circuit board (PCB) or distributed over several interconnected PCBs. A processor may contain other processing circuits; for example, a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. Also, unless explicitly stated, the embodiments described herein are not mutually exclusive. Aspects of the embodiments described herein may be combined in some implementations.

With respect to the flow diagrams of FIGS. 4-7, it should be understood that the sequence of steps of the processes of these flow diagrams are not fixed, but can be modified, changed in order, performed differently, performed sequentially, concurrently, or simultaneously, or altered into any desired sequence, as recognized by a person of skill in the art.

As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of systems and methods for managing I/O requests in a heterogeneous storage system have been specifically described and illustrated herein, many modifications and variations will be apparent to those skilled in the art. Accordingly, it is to be understood that systems and methods for managing I/O requests in a heterogeneous storage system constructed according to principles of this disclosure may be embodied other than as specifically described herein. The disclosure is also defined in the following claims, and equivalents thereof.

The systems and methods for managing I/O requests in a heterogenous storage system may contain one or more combination of features set forth in the below statements.

Statement 1: A method for managing a storage system comprising a first storage device and a second storage device different from the first storage device, the method comprising: receiving a first storage operation for a first portion of a file; identifying a data structure associated with the file; identifying, based on the data structure, the first storage device for the first portion of the file; and transmitting the first storage operation to the first storage device, wherein in response to the first storage operation, the first storage device updates or accesses the first portion of the file.

Statement 2: In the method of statement 1, the data structure includes a tree data structure having a first node and a second node, wherein the first node includes first information on the first portion of the file, and the second node includes second information on a second portion of the file, wherein the second portion of the file is stored in the second storage device.

Statement 3: In the method of one of statements 1 or 2, the first information identifies first metadata in a first file system, and the second information identifies second metadata in a second file system different from the first file system.

Statement 4: In the method of one of statements 1-3, the file is a logical file in a virtual namespace, wherein the logical file abstracts the first file system and the second file system, from an application.

Statement 5: In the method of one of statements 1-4, the first storage operation is directed to the virtual namespace, and the method comprises receiving a second storage operation directed to the virtual namespace; identifying a second storage device; and transmitting the second storage operation to the second storage device.

Statement 6: In the method of one of statements 1-5, the method further comprises receiving a second storage operation for a second portion of the file; identifying the data structure associated with the file; identifying, based on the data structure, the second storage device for the second portion of the file; and transmitting the second storage operation to the second storage device, wherein in response to the second storage operation, the second storage device updates the second portion of the file concurrently with the first storage device updating the first portion of the file.

Statement 7: In the method of one of statements 1-6, the method further comprises identifying a first processing thread assigned to the first storage device; determining throughput of the first processing thread; and reassigning the first processing thread to the second storage device based on the throughput.

Statement 8: In the method of one of statements 1-7, the method further comprises calculating utilization of a processing resource by the first processing thread; determining availability of the processing resource in a first processing set; and borrowing the processing resource from a second processing set in response to the determining.

Statement 9: In the method of one of statements 1-8, the first portion of the file includes a first block of data of the file, and the second portion of the file includes a second block of data of the file.

Statement 10: In the method of one of statements 1-9, the first storage device is a non-volatile memory device, and the second storage device is a solid state drive.

Statement 11: A system for managing a storage system comprising a first storage device and a second storage device different from the first storage device, the system comprising: a processor; and a memory, wherein the memory stores instructions that, when executed by the processor, cause the processor to: receive a first storage operation for a first portion of a file; identify a data structure associated with the file; identify, based on the data structure, the first storage device for the first portion of the file; and transmit the first storage operation to the first storage device, wherein in response to the first storage operation, the first storage device updates or accesses the first portion of the file.

Statement 12: In the system of statement 11, the data structure includes a tree data structure having a first node and a second node, wherein the first node includes first information on the first portion of the file, and the second node includes second information on a second portion of the file, wherein the second portion of the file is stored in the second storage device.

Statement 13: In the system of one of statements 11 or 12, the first information identifies first metadata in a first file system, and the second information identifies second metadata in a second file system different from the first file system.

Statement 14: In the system of one of statements 11-13, the file is a logical file in a virtual namespace, wherein the logical file abstracts the first file system and the second file system, from an application.

Statement 15: In the system of one of statements 11-14, the first storage operation is directed to the virtual namespace, and the instructions further cause the processor to: receive a second storage operation directed to the virtual namespace; identify a second storage device; and transmit the second storage operation to the second storage device.

Statement 16: In the system of one of statements 11-15, the instructions further cause the processor to: receive a second storage operation for a second portion of the file; identify the data structure associated with the file; identify, based on the data structure, the second storage device for the second portion of the file; and transmit the second storage operation to the second storage device, wherein in response to the second storage operation, the second storage device updates the second portion of the file concurrently with the first storage device updating the first portion of the file.

Statement 17: In the system of one of statements 11-16, the instructions further cause the processor to: identify a first processing thread assigned to the first storage device; determine throughput of the first processing thread; and reassign the first processing thread to the second storage device based on the throughput.

Statement 18. In the system of one of statements 11-17, the instructions further cause the processor to: calculate utilization of a processing resource by the first processing thread; determine availability of the processing resource in a first processing set; and borrow the processing resource from a second processing set in response to the instructions that cause the processor to determine the availability.

Statement 19. In the system of one of statements 11-18, the first portion of the file includes a first block of data of the file, and the second portion of the file includes a second block of data of the file.

Statement 20. In the system of one of statements 11-19, the first storage device is a non-volatile memory device, and the second storage device is a solid state drive.

What is claimed is:

1. A method for managing a storage system comprising a first storage device and a second storage device different from the first storage device, the method comprising:
receiving a first storage operation for a first portion of a file;
identifying a data structure associated with the file, wherein the data structure includes first information on the first portion of the file and second information on a second portion of the file, wherein the first information identifies first metadata in a first file system, and the second information identifies second metadata in a second file system different from the first file system;
identifying, based on the data structure, the first storage device for the first portion of the file; and
transmitting the first storage operation to the first storage device, wherein in response to the first storage operation, the first storage device updates or accesses the first portion of the file.

2. The method of claim 1, wherein the data structure includes a tree data structure having a first node and a second node, wherein the first node includes the first information on the first portion of the file, and the second node includes the second information on the second portion of the file, wherein the second portion of the file is stored in the second storage device.

3. The method of claim 1, wherein the file is a logical file representing a first physical file in the first storage device, and a second physical file in the second storage device.

4. The method of claim 3, wherein the logical file is associated with a virtual namespace, wherein the logical file abstracts the first file system and the second file system, from an application.

5. The method of claim 4, wherein the first storage operation is directed to the virtual namespace, the method comprising:
receiving a second storage operation directed to the virtual namespace;
identifying the second storage device; and
transmitting the second storage operation to the second storage device.

6. The method of claim 2 further comprising:
receiving a second storage operation for the second portion of the file;
identifying the data structure associated with the file;
identifying, based on the data structure, the second storage device for the second portion of the file; and
transmitting the second storage operation to the second storage device, wherein in response to the second storage operation, the second storage device updates the second portion of the file concurrently with the first storage device updating the first portion of the file.

7. The method of claim 6 further comprising:
identifying a first processing thread assigned to the first storage device;
determining throughput of the first processing thread; and
reassigning the first processing thread to the second storage device based on the throughput.

8. The method of claim 7 further comprising:
calculating utilization of a processing resource by the first processing thread;
determining availability of the processing resource in a first processing set; and
borrowing the processing resource from a second processing set in response to the determining.

9. The method of claim 2, wherein the first portion of the file includes a first block of data of the file, and the second portion of the file includes a second block of data of the file.

10. The method of claim 2, wherein the first storage device is a non-volatile memory device, and the second storage device is a solid state drive.

11. A system for managing a storage system comprising a first storage device and a second storage device different from the first storage device, the system comprising:
- a processor; and
- a memory, wherein the memory stores instructions that, when executed by the processor, cause the processor to:
  - receive a first storage operation for a first portion of a file;
  - identify a data structure associated with the file, wherein the data structure includes first information on the first portion of the file and second information on a second portion of the file, wherein the first information identifies first metadata in a first file system, and the second information identifies second metadata in a second file system different from the first file system;
  - identify, based on the data structure, the first storage device for the first portion of the file; and
  - transmit the first storage operation to the first storage device, wherein in response to the first storage operation, the first storage device updates or accesses the first portion of the file.

12. The system of claim 11, wherein the data structure includes a tree data structure having a first node and a second node, wherein the first node includes the first information on the first portion of the file, and the second node includes the second information on the second portion of the file, wherein the second portion of the file is stored in the second storage device.

13. The system of claim 11, wherein the file is a logical file representing a first physical file in the first storage device, and a second physical file in the second storage device.

14. The system of claim 13, wherein the logical file is associated with a virtual namespace, wherein the logical file abstracts the first file system and the second file system, from an application.

15. The system of claim 14, wherein the first storage operation is directed to the virtual namespace, wherein the instructions further cause the processor to:
- receive a second storage operation directed to the virtual namespace;
- identify the second storage device; and
- transmit the second storage operation to the second storage device.

16. The system of claim 12, wherein the instructions further cause the processor to:
- receive a second storage operation for the second portion of the file;
- identify the data structure associated with the file;
- identify, based on the data structure, the second storage device for the second portion of the file; and
- transmit the second storage operation to the second storage device, wherein in response to the second storage operation, the second storage device updates the second portion of the file concurrently with the first storage device updating the first portion of the file.

17. The system of claim 16, wherein the instructions further cause the processor to:
- identify a first processing thread assigned to the first storage device;
- determine throughput of the first processing thread; and
- reassign the first processing thread to the second storage device based on the throughput.

18. The system of claim 17, wherein the instructions further cause the processor to:
- calculate utilization of a processing resource by the first processing thread;
- determine availability of the processing resource in a first processing set; and
- borrow the processing resource from a second processing set in response to the instructions that cause the processor to determine the availability.

19. The system of claim 12, wherein the first portion of the file includes a first block of data of the file, and the second portion of the file includes a second block of data of the file.

20. The system of claim 12, wherein the first storage device is a non-volatile memory device, and the second storage device is a solid state drive.

* * * * *